(No Model.)
J. THOMPSON.
CAR BRAKE.
No. 259,060. Patented June 6, 1882.
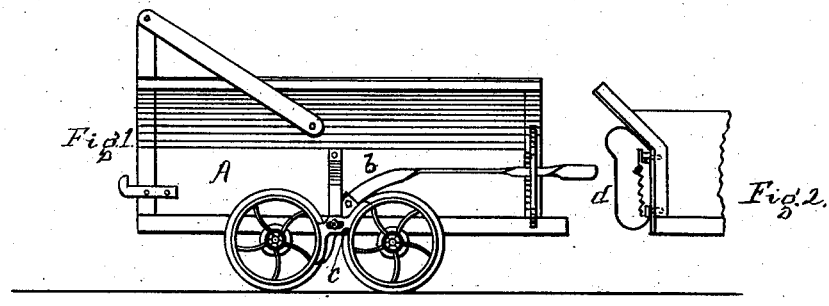
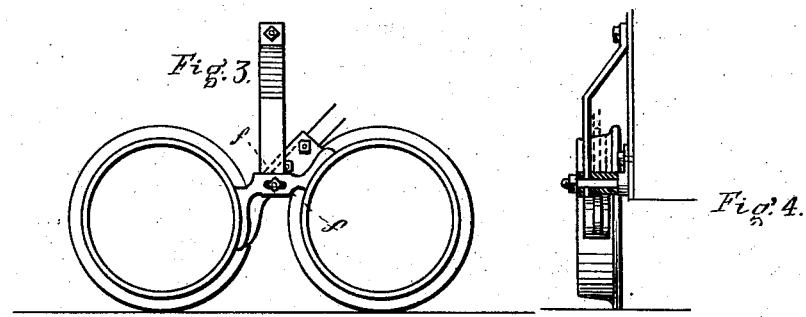
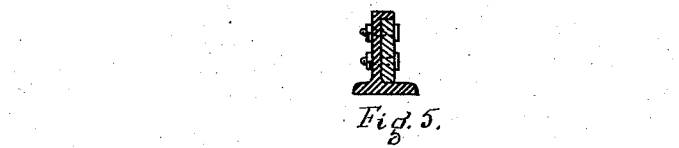
Witnesses
J. J. Lehman
C. H. Clark
John Thompson, Inventor,
By Tracy, Dyer & Wilber,
Attorneys.

United States Patent Office.

JOHN THOMPSON, OF BUCYRUS, OHIO.

CAR-BRAKE.

SPECIFICATION forming part of Letters Patent No. 259,060, dated June 6, 1882.

Application filed June 13, 1881. (No model.)

*To all whom it may concern:*

Be it known that I, JOHN THOMPSON, of Bucyrus, county of Crawford, and State of Ohio, have invented a new and Improved Brake for Bank or Pit Cars; and I do hereby declare that the following is a full, clear, and exact description of the same, reference being made to the accompanying drawings, and to letters of reference marked thereon.

My invention relates to improvements in brakes for bank or pit cars, and has for its objects to provide a double-faced brake piece or shoe, with a slotted hole for the reception of a pin or bolt in the lever by which it is operated, for the purpose of allowing said brake to adjust itself to the surfaces of the wheels on which it is to act by the pressure of the brake-lever when set; also, to operate said brake-piece by means of an elastic lever that will adjust itself to the notches in a rack designed for holding said lever securely in place when set. I accomplish these objects by means of the mechanism illustrated in the accompanying drawings, in which—

Figure 1 is a side view of a car with the brake attached; Fig. 2, a side view of rack and lever. Fig. 3 is a view of the brake-piece in place, showing mode of attachment to car and brake, and the manner in which it is made to act upon wheels when the handle of the lever is depressed. Fig. 4 is a sectional view of lever and face of wheels, to illustrate the mode of action of brake-block. Fig. 5 is a section of brake-block and lever.

Similar letters refer to similar parts in all the drawings.

Fig. 1 is an ordinary car for bank or pit use, mounted on a single bogie or four-wheel truck. *b* is a lever of iron or steel, pivoted to a proper support on the side of the car over the truck and between the wheels. It is made sufficiently strong to give the proper pressure to the brake-blocks, yet not so much so as to be rigid, bending slightly when pressure is applied. The upper end or handle is made to fit the notches of a rack attached to the side of the car, and intended to hold it in place when in action under greater or less tension, as may be required.

Fig. 2 is a section or end view of rack and handle of lever. *d* is a guard or clasp to keep lever *b* from being displaced.

Fig. 3 is an enlarged view of one pair of wheels, showing the brake between them, with a portion of the lever *b*. C is the brake-piece, having a right-and-left face acting on either wheel. It is pivoted to the lower end of lever *b* by a bolt passing through a slot, *e*, for the purpose of allowing the faces of the brake to adjust themselves to both wheels. The shape of brake-piece C is peculiar, but can be readily understood by examining the drawings.

Fig. 4 is a sectional view of wheel and brake-piece, showing the mode of application of the latter.

Fig. 5 is a section of lever and brake-piece at *f f*, showing the mode of attachment of one to the other.

The mode of operation of this apparatus will be easily comprehended, and need not be fully explained.

When it is desired to check the motion of the car, pressure on the handle of the brake will bring into action both wings of the brake-block with greater or less force, according to the pressure applied, which pressure may be maintained indefinitely by hooking the lever into one of the notches of the rack.

Having thus described my invention, what I claim as new, and wish to secure by Letters Patent, is—

1. A pivoted brake consisting of a body portion having a horizontal slot, to allow self-adjustment upon the pivot, and provided with an upwardly-projecting flange and reversed end heads or bearing-surfaces, in combination with a pair of car-wheels, a suitable support, and a lever fastened to the flange of the shoe, as and for the purpose set forth.

2. The combination of the spring-lever *b*, its retaining device, and fixed pivot-bolt *f*, with the slotted brake-shoe, carrying said lever, and a car-body, as herein set forth.

This specification signed and witnessed this 30th day of April, 1881.

JOHN THOMPSON.

Witnesses:
S. R. HARRIS,
D. W. LOCKE.